United States Patent [19]
Pierce

[11] Patent Number: 5,231,403
[45] Date of Patent: Jul. 27, 1993

[54] MOVING TARGET INDICATOR USING HIGHER ORDER STATISTICS

[75] Inventor: Robert D. Pierce, Sterling, Va.

[73] Assignee: The United States of America as represented by the Secretary of the Navy, Washington, D.C.

[21] Appl. No.: 953,622

[22] Filed: Sep. 30, 1992

[51] Int. Cl.$^5$ ............................................. G01S 13/00
[52] U.S. Cl. .................................. 342/192; 342/116; 342/160
[58] Field of Search ............... 342/192, 104, 111, 116, 342/196, 160

[56] References Cited

U.S. PATENT DOCUMENTS

| | | | |
|---|---|---|---|
| 4,555,705 | 11/1985 | Bossennec et al. | 342/104 X |
| 4,723,124 | 2/1988 | Boles | 342/196 X |
| 4,847,622 | 7/1989 | Maitre et al. | 342/111 X |
| 5,122,805 | 6/1992 | Peterman et al. | 342/196 X |
| 5,157,403 | 10/1992 | Urkowitz | 342/111 |
| 5,168,214 | 12/1992 | Engeler et al. | 342/192 X |

*Primary Examiner*—Mark Hellner
*Attorney, Agent, or Firm*—Charles D. Miller

[57] ABSTRACT

While the computation of high resolution radar images based on higher order statistics is position insensitive, velocity estimation may be based on the ratios of values of a trispectral slice and a cross-trispectral slice computed as quadruple products of complex valued signals developed by coherent radar. Signal-to-noise ratio is improved by either averaging over a plurality of bursts during computation of both the trispectral slice and the cross-trispectral slice or averaging of values of ratios of trispectral slice and cross-trispectral slice values at particular frequencies or wavenumbers, or both.

10 Claims, 7 Drawing Sheets

MOVING TARGET INDICATOR USING HIGHER ORDER STATISTICS

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

The present invention is related to U.S. patent application Ser. No. 07/904,927 still pending, filed Jun. 26, 1992, entitled HIGH RESOLUTION RADAR PROFILING USING HIGHER-ORDER STATISTICS by Robert D. Pierce, assigned to the assignee of the present invention, and which is hereby fully incorporated by reference.

DESCRIPTION

BACKGROUND OF THE INVENTION

1. Field of the Invention

The present invention generally relates to systems such as radar, sonar and the like which derive information from signals returned by reflection from a target and, more particularly, to estimation of the velocity of a moving target or targets, especially in connection with high resolution imaging or profiling of radar targets.

2. Description of the Prior Art

The use of radar, sonar and other arrangements for detecting the location of objects by analysis of signals transmitted from a known location and reflected by a target has long been known and has become well-developed. At the present state of the art, imaging of a stationary target is possible to determine some of the physical characteristics of the target. Such imaging techniques are perhaps most fully developed in devices for producing images known as sonograms where the target is usually stationary and the imaging is done over a very short range and in an environment which is reasonably quiet or where noise is reasonably predictable. Another such field is that of seismic tomography in which the imaging range and noise may be greater but the imaged subsurface structure is, necessarily, stationary.

High resolution radar (HRR) or sonar imaging or profiling, which may be regarded as one-dimensional imaging along a direction which is radial to the radar transmitter/receiver, on the other hand, presents a much larger range to the target which is typically in motion and a much noisier environment. Particularly in marine environments, HRR profiling will usually involve a moving target and many noise sources such as wave surfaces which will also be in motion. Therefore, particularly in such applications, the extraction of an image or profile from a signal which may have a low signal to noise ratio is of particular concern.

In high resolution radar, the down-range resolution of the radar is generally selected to be smaller than the anticipated length of the object. The length of the radar's pulse, however, is set to be more than twice the object's length, and therefore, sea clutter as well as system noise is present in these down-range profiles.

Since noise is generally a more or less random phenomenon and relatively rapidly changing relative to a target, averaging of returned signals has generally been the technique of choice for reducing noise and increasing the signal to noise ratio of the detected return signal. Specifically, random variation of the noise component of signals, when averaged over a number of iterations or bursts when groups of signals are transmitted as a burst, causes the noise components to average to zero as the number of samples becomes large. Thus, the component of a returned signal which is attributable to reflections from a stationary target may be greatly enhanced with respect to noise since these signals will be largely invariant and will average to a non-zero value.

A substantial difficulty is encountered, however, where the target is moving. Even with a relatively noise-free environment, such movement will cause blurring of a high resolution image. In noisy environments, the enhancement of the signal to noise ratio by averaging is much less effective since the portion of the signal attributable to the target is also changing and generally tends to also average to zero. This is particularly true of radar and sonar applications where the returned signal reflects changes of position in both the amplitude and phase of the returned signals. Because of the complex nature of radar and sonar signals, the application of signal enhancement techniques for high resolution imaging has been particularly difficult. In general, averaging has remained the signal enhancement technique of choice with some variations applied thereto in order to lessen the deleterious effects of target motion.

Pre- and post-detection integration are two general methods for processing radar signals to reduce noise and clutter. Consider a series of down-range profiles that are generated as a function of time. If the target is stationary relative to the radar and the clutter sources are moving (reflections from ocean waves), then pre-detection integration (coherent averaging using first-order statistics) of these profiles will enhance the object relative to this clutter and system noise. When the object is moving, however, both the object and the clutter are averaged toward zero. The use of post-detection integration (non-coherent averaging using second-order statistics) with these profiles when moving objects are present, results in averages smeared by the motion. Other methods, such as track-before-detect, are used with non-coherent averaging to try to compensate for this motion. With this approach, a series of target trajectories is postulated and tested. The problem with this method is that many processing stages are required, and, since the phase is lost, the second-order averages contain less target information.

For example, coherent averaging techniques could, in theory, enhance the signal to noise ratio (SNR) of a returned signal just as effectively for a moving target as for a stationary one if the trajectory of the target were known. Ideally, in such a case, the returned signals could be first processed to compensate for the target motion and averaging carried out on the compensated signals. However, this is seldom the case and attempts at such an approach have generally involved postulating a plurality of trajectories of the target, performing the averaging processing for each of the postulated trajectories and then simply choosing the result with the highest final SNR which will occur for the postulated trajectory which most closely matches the actual trajectory. This technique is computationally intensive and, as a practical matter, does not guarantee enhancement of the signal to noise ratio since small errors of uncompensated motion cause rapid loss of the benefits of averaging techniques.

Many techniques are also known for improvement of signal to noise ratio in image processing by correlation of image samples or image frames. However, in such applications the data generally represents a real image such as a map of intensity values rather than signals which have yet to be reduced to an image, as in the case of radar and sonar. For example, in the publication "Shift and Rotation Invariant Object Reconstruction Using the Bispectrum" by Brian M Sadler, presented at a "Workshop on Higher-Order Spectral Analysis", sponsored by the Office of Naval Research and the National Science Foundation in cooperation with several IEEE societies, Jun. 28-30, 1989, a technique of image extraction from 10 frames containing a binary image and white Gaussian noise at an SNR of $-10$ db by using averaging of a triple correlation (bispectrum) was presented. However, this technique is not applicable to radar or sonar signals which are complex (e.g. contain phase information) since the phase information would cause averaging of the triple correlation to go to zero by the technique disclosed therein.

Even though it is known that processing of higher order spectra (bispectra, trispectra, etc. involving correlation by forming a product of more than two variables) is capable of preserving phase information, as taught by "Advances in Spectrum Analysis and Array Processing, Volume I", Simon Haykin, Editor: Prentice-Hall, 1991, and an article entitled "Higher-Order Spectral Analysis" by Chrysostomos L. Nikias, included therein, and the possibility of improvement of SNR of stochastic signals was recognized, a practical technique of extraction or reconstruction of high resolution images of a moving radar target from a noisy signal has not, heretofore, been achieved.

It should also be recognized in this regard, that target motion includes the relative motion of the transmitter of energy and/or receiver of reflected energy relative to the target and along the energy transmission and return paths. Therefore, degradation of the high resolution image can occur in many desirable applications such as vibration in aircraft, body motion in sonograms, and motion of density gradients of the surrounding medium in atmospheric and marine environments. Therefore, the inability to obtain high resolution images or profiles of moving targets has been a major limitation on high resolution radar in particular.

A solution to the improvement of signal to noise ratio (SNR) is provided in the above incorporated patent application involving the estimation of a position invariant portion of the trispectrum, referred to as a trispectral slice which may be averaged and the profile corresponding to that average recreated by performing a Fourier transform on that slice. However, due to the position invariant properties of that trispectral slice estimation, velocity information is suppressed. Therefore, such velocity information could only be obtained by other radar signals and/or radar signal processing techniques. Since the high precision information available from high resolution radar is computationally intensive, the performance of different computations on other data which does not suppress position or velocity information has substantially complicated radar imaging and has required objectionable amounts of time in order to extract both the profile of a collective target and its velocity.

SUMMARY OF THE INVENTION

It is therefore an object of the present invention to provide a practical technique of obtaining velocity information concerning a target together with extraction and/or reconstruction of profiles of a moving target from a noisy reflected signal.

It is another object of the invention to provide a technique of profile extraction which is unaffected by target motion, trajectory or acceleration and is applicable to arbitrary target motion as well as characterizing that motion.

It is a further object of the invention to provide a computationally practical technique of exploiting the properties of higher-order statistics (HOS) to the reconstruction or extraction of profiles from radar return signals which does not suppress velocity information.

In order to accomplish these and other objects of the invention, a method of estimating velocity of a radar target is provided including the steps of reflecting at least first and second bursts of energy from a radar target, the first and second bursts being separated in time, each burst of energy including a plurality of frequencies or wavenumbers, and deriving a value from energy reflected from the target for each frequency or wavenumber of each burst, computing values of a trispectral slice from the values derived from for a plurality of frequencies or wavenumbers of the first burst, computing values of a cross-trispectral slice from the values derived from for a plurality of corresponding frequencies or wavenumbers of the first and second bursts, deriving ratios of corresponding values of the trispectral slice and the cross-trispectral slice to form a series of values corresponding to a function of frequencies or wavenumbers of the first burst, performing a transformation of at least one of the series of values corresponding to a function of frequencies or wavenumbers of the first burst and the function of frequencies or wavenumbers of the first burst to form a function of time, and estimating the velocity of a radar target from a maximum value of the function of time.

In accordance with another aspect of the invention, a radar system is provided including a multiplying arrangement for computing values of a trispectral slice from complex values corresponding to energy in at least a first energy burst reflected from a target and a cross-trispectral slice from complex values corresponding to energy in at least first and second energy bursts separated in time and reflected from a target and a divider arrangement for computing a ratio of corresponding values of the trispectral and cross-trispectral slices.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
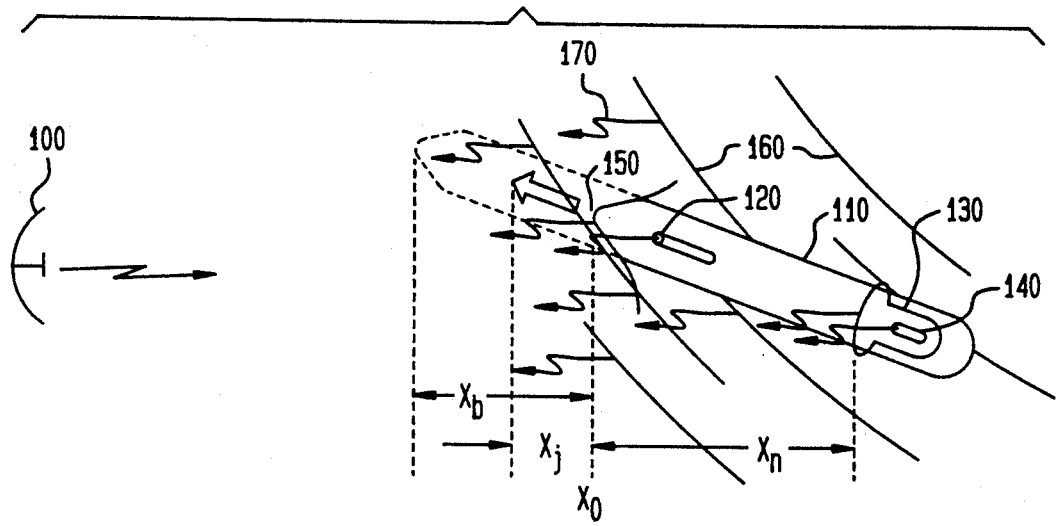
FIG. 1 is a plan view of an arbitrary positional relationship between a radar transmitter/receiver and a target to be imaged.

Referring now to the drawings, and more particularly to FIG. 1, there is shown an arbitrary relative positioning of a radar transmitter/receiver and a target amid sources of random radar reflections or clutter as might be encountered in a marine environment. Antenna 100 schematically represents a radar transmitter/receiver and boat 110 represents a collective target. Collective target 110, for purposes of high resolution imaging will be likely to include a plurality of sub-targets 120, 130 and 140 as particular portions of the superstructure thereof. These sub-targets (hereinafter referred to simply as "targets" in view of the high resolution imaging to which the invention is preferably directed where particular features of the collective target are to be resolved) may be, for example, a major portion of the superstructure 130, a crane 120, hull feature 150 and an exhaust stack 140. The object of HRR is to obtain a down range profile of the radar cross-section of each of these features, essentially as a signature, from which a plan view of the collective target (e.g. a ship) can be inferred.

Incidentally, it is to be understood that while the preferred application of the invention is to the field of HRR in marine environments where the advantages thereof are particularly great and well-contrasted with presently known imaging techniques, it is to be understood that the invention is not to be considered as limited thereto, but is equally applicable to any system which operates upon signals having amplitude and quadrature values returned by reflection from a target. It should also be understood that any physical interface capable of partially reflecting energy transmitted thereto through a medium or a vacuum forms a suitable target for any such system and will be hereinafter referred to as such.

In the environment depicted in FIG. 1, movement of the collective target 110 and the targets 120-140 is depicted by arrow 150. It should also be understood that the angle of arrow 150 relative to the radial direction may effectively impart a rotational motion to the collective target relative to the radar transmitter/receiver. As will be explained in greater detail below, such relative rotational motion must be very small and thus it is assumed for purposes of this discussion that the distance between the radar transmitter/receiver 100 and the collective target 110 is several orders of magnitude greater than the angular component of travel of the collective target 110 over the averaging period so that the relative rotational motion of the collective target is small enough to be neglected. As a practical matter, the rotational motion must be sufficiently slow that the distance between targets 120, 130, 140, in the radial direction remains relatively small in comparison with the desired resolution, which may be as small as several inches.

The waves 160 on the water surface can also reflect radar signals such as are depicted at 170 and which are commonly referred to as clutter which is a major portion of the noise of the environment. It should also be noted that the reflections from each of the targets 120-150 and clutter 170 is depicted as having a relative magnitude which is generally referred to as a radar cross-section (RCS) which forms a component of the down-range profile which the HRR seeks to develop.

In an environment with relatively low noise and clutter, the return radar signals would have much the appearance of the time series of signals shown, in the upper (e.g. later) traces of FIG. 2. The return from each of the targets 120, 130 and 140 is indicated by 120', 130' and 140', respectively. The time offset from trace to trace resulting in a diagonal appearance is indicative of the component of motion of the collective target 110 radially to the radar receiver. The difference from trace to trace in FIG. 2 such that reflections from individual targets do not overlap indicates that averaging will be ineffective to improve signal to noise ratio since the reflections from each target would average to zero even over a small number of traces. Improvement of the signal to noise ratio can only be done in such a case if the trajectory of the collective target 110 can be closely approximated. Even the application of an approximate correction of trace to trace offsets as indicated by line 190 would not provide significant improvement in SNR by averaging since the uncorrected motion indicated by angle A would substantially reduce the desired signal as well as the noise. Therefore, it is seen that target motion makes the returned signals insusceptible to significant improvement by averaging unless the trajectory of the collective target 110 is known or accurately estimated.

Figure 2:
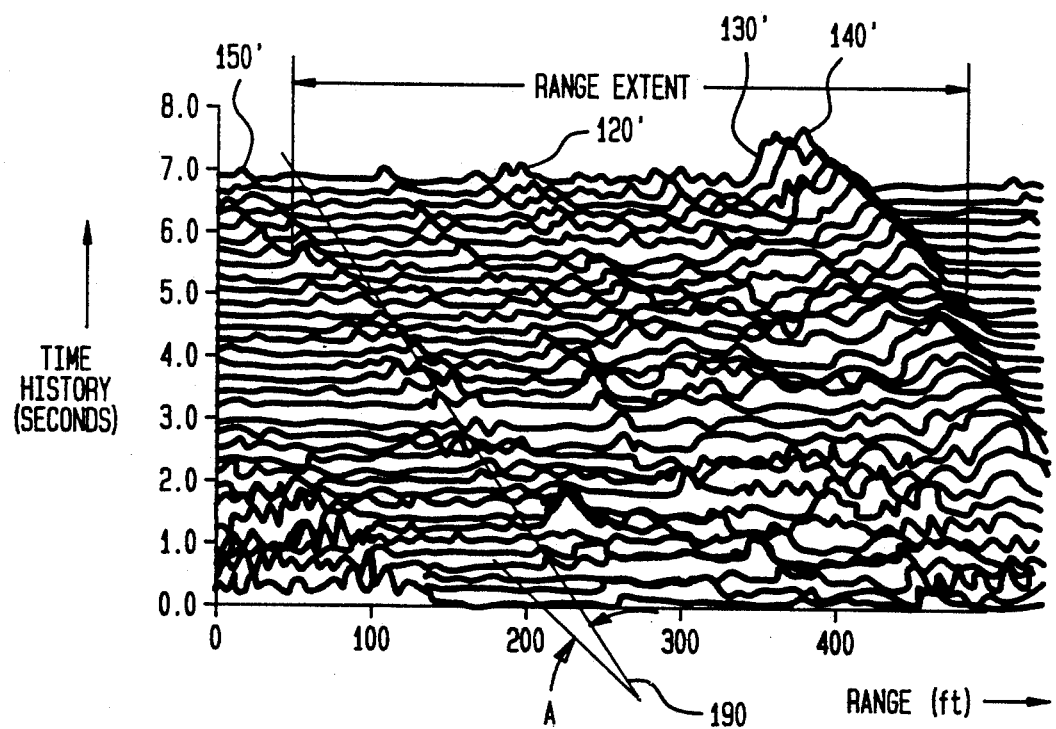
FIG. 2 is a graph of radar signals generally corresponding to FIG. 1 (from Wehner—"High Resolution Radar", Artech House, 1987)
Figure 3:
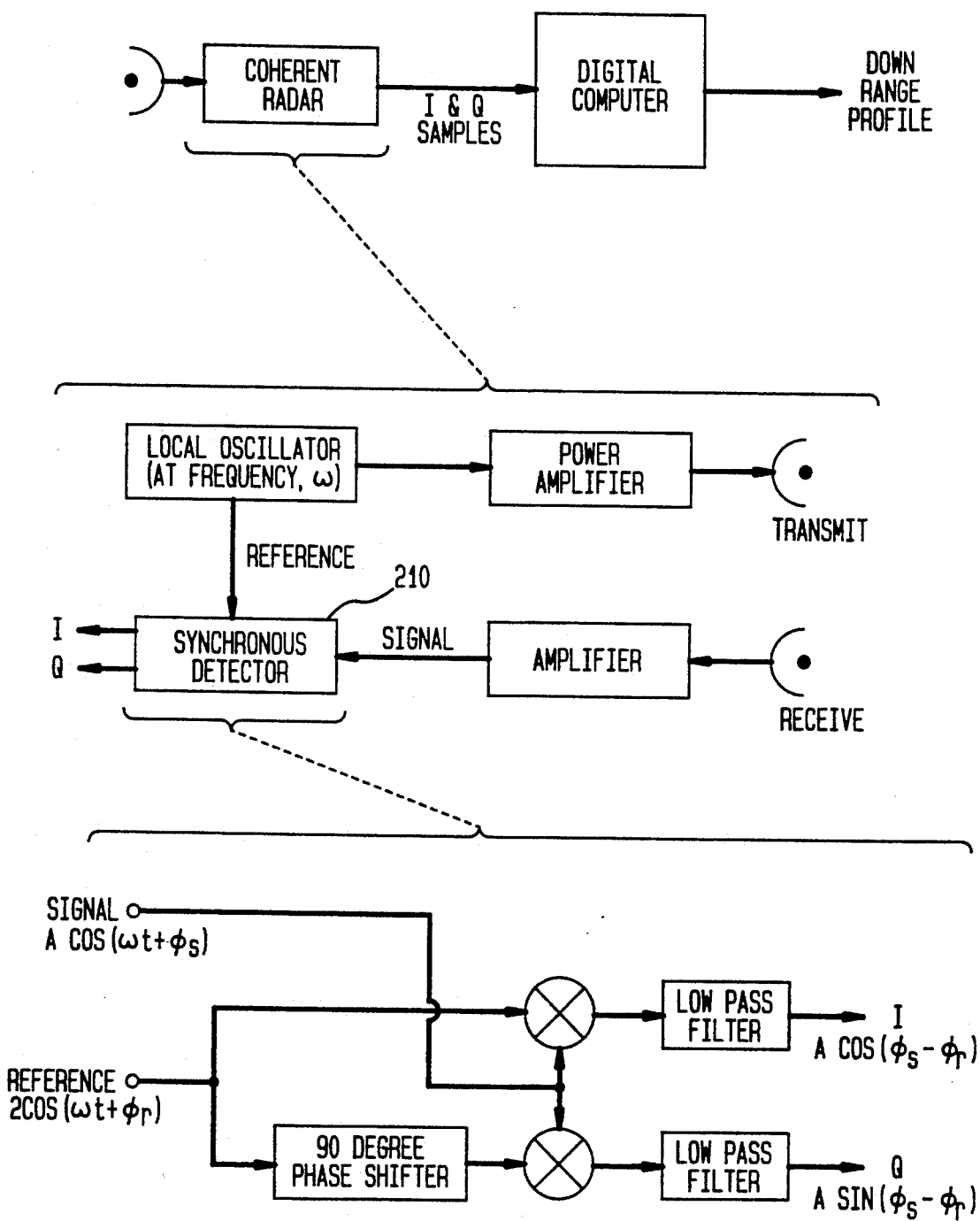
FIG. 3 is a schematic diagram of a coherent radar system and digital computer for signal analysis embodying the invention.

The apparatus for producing the traces of FIG. 2 is shown schematically in FIG. 3. The overall arrangement 200 includes a coherent radar system 201 and a digital computer 220 for processing the signals. The coherent radar includes a local oscillator 202 driving a power amplifier 203 in order to transmit energy to a target from an antenna or other transducer. The returned signal is received by the same or another transducer, amplified at 204 and synchronous detection performed by synchronous detector 210. The synchronous detector 210 includes a phase shifter 205 which applies a shifted reference signal to multiplier 207. The reference signal is directly applied to multiplier 206. Multipliers 206 and 207 also receive the returned signal from amplifier 204. Low pass filtering is applied to both channels to remove harmonics in the outputs of the multipliers and the filtered signals are output to digital computer 220.

Digital computer 220 in accordance with the invention, provides, preferably by means of a suitable program, means for forming a special case of a quadruple product based on the I and Q components of the synchronous detector output, thus developing a trispectral slice and then averaging over a plurality of trispectral slices corresponding to preferably sequential radar return signal bursts to obtain an estimator of the down range profile desired, as will be discussed in greater detail below. The digital computer then also reconstructs a burst having the same values for a trispectral slice (which could be similarly derived) as the average of a plurality of trispectral slices corresponding to actual radar return signals.

Signal processing with higher-order statistics (HOS) offers a new approach for obtaining high resolution radar measurements that exhibit a degree of immunity to the presence of sea clutter and that compensate for target motion in the down range profile. This technique is based on certain desirable features associated with higher-order statistics; specifically, preservation of phase information, insensitivity to linear phase shifts produced by translational target motion, and reduction of Gaussian noise components, which are identically zero for the HOS domain. These characteristics are incorporated by the methodology in accordance with the invention disclosed in the above-incorporated patent application of Robert D. Pierce to enhance a target's radar cross section (RCS) relative to the sea clutter and noise. To make use of these characteristics in accordance with the invention in a stepped-frequency, coherent radar, for example, the samples from the radar's synchronous detector 210 are coherently averaged in a special two-dimensional slice of the trispectrum which is insensitive to target motion in the radial direction relative to the radar transmitter/receiver. The averaging process enhances the target relative to the radar system noise and clutter. The formulation of this average was chosen to selectively avoid the effects of phase shifts associated with down-range target motion. A single burst of these samples is then reconstructed or synthesized such that this reconstructed (i.e. "average" or "characteristic") burst produces the same trispectral slice as the average. The reconstructed slice is then transformed using the discrete Fourier transform to produce the average or enhanced down-range profile. The particular computational technique and hardware architecture therefor are fully disclosed in the above incorporated application, particularly with reference to FIG. 5 thereof, and need not be repeated here.

The averaged trispectral slice is treated as an estimator, and the statistical performance of this estimator is evaluated below. In the interior of this trispectral slice, the average is unbiased by Gaussian noise. While the variance of the estimator is highly dependent on the amount of noise present, substantial improvement of SNR can be achieved under most circumstances. The signal-to-noise improvement factor for the HOS approach (e.g. moving target, unknown trajectory) is compared to the optimum improvement possible with coherent averaging (fixed target or known trajectory). The improvement factor for ideal coherent averaging is independent of the signal-to-noise ratio; however, the HOS approach exhibits a high dependence on the signal-to-noise ratio. For high signal-to-noise, the HOS improvement ratio approaches the optimum represented by ideal coherent averaging. For low signal-to-noise, however, progressively less and less improvement is possible.

Although the invention described in the above-incorporated application 07/904,927 exploits numerous simplifications of the necessary calculations, the number of calculations which must be performed remains very high. Further contributing to the number of calculations is the fact that they are generally performed on signals returned in response to successive bursts of transmitted energy, each burst including a sequence of transmissions at different frequencies, each frequency preferably differing from an adjacent (although not necessarily sequential) frequency. Therefore, it is desirable to extract as much information as possible from the calculations required by the process. Of course, information concerning velocity of the target object is generally desirable. However, as noted above, that invention is directed to obtaining a profile of the sub-targets which may comprise the target object in the down-range direction and the computations embodied therein effectively suppress both position and motion information concerning such a collective target.

Accordingly, the present invention estimates velocity by a particular comparison technique applied to the signals returned from two bursts of transmitted energy which are separated in time, even though position information is suppressed. This comparison technique develops an estimate for distance $x_b$, shown in FIG. 1, which is traversed by the collective target during the time separation between the bursts while maintaining the meritorious levels of noise reduction of the prior invention and also using the computation of the trispectral slice as in that technique as a major portion (about one-third) of the computations in accordance with the present invention. This estimate of distance traversed and the time interval is sufficient for estimation of velocity of the collective target.

Figure 4:
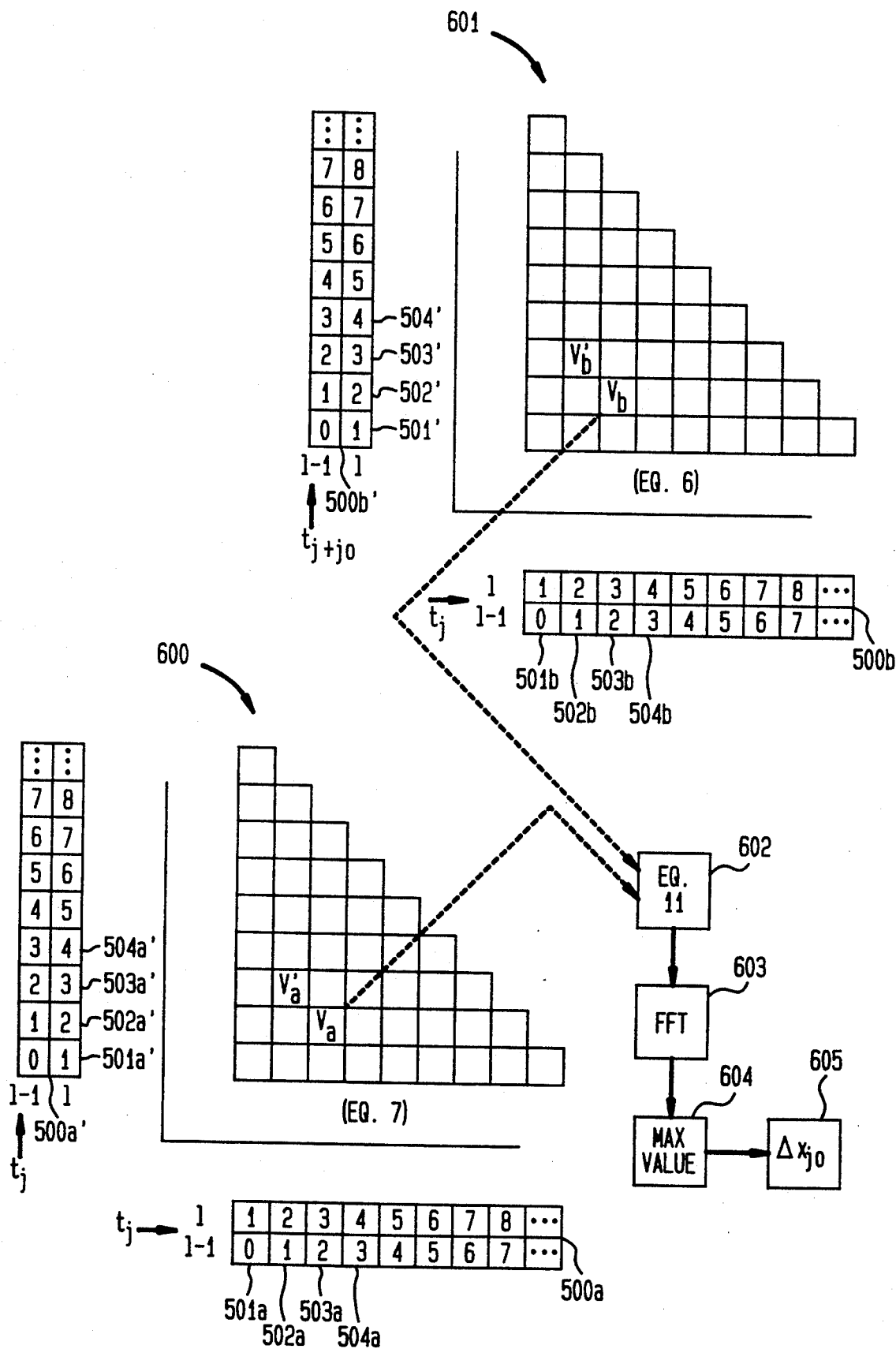
FIG. 4 is a diagram depicting the derivation of an exemplary pair of trispectral slices, particularly as it is accomplished by data processing apparatus in accordance with the invention for derivation of velocity information.
Figure 4A:
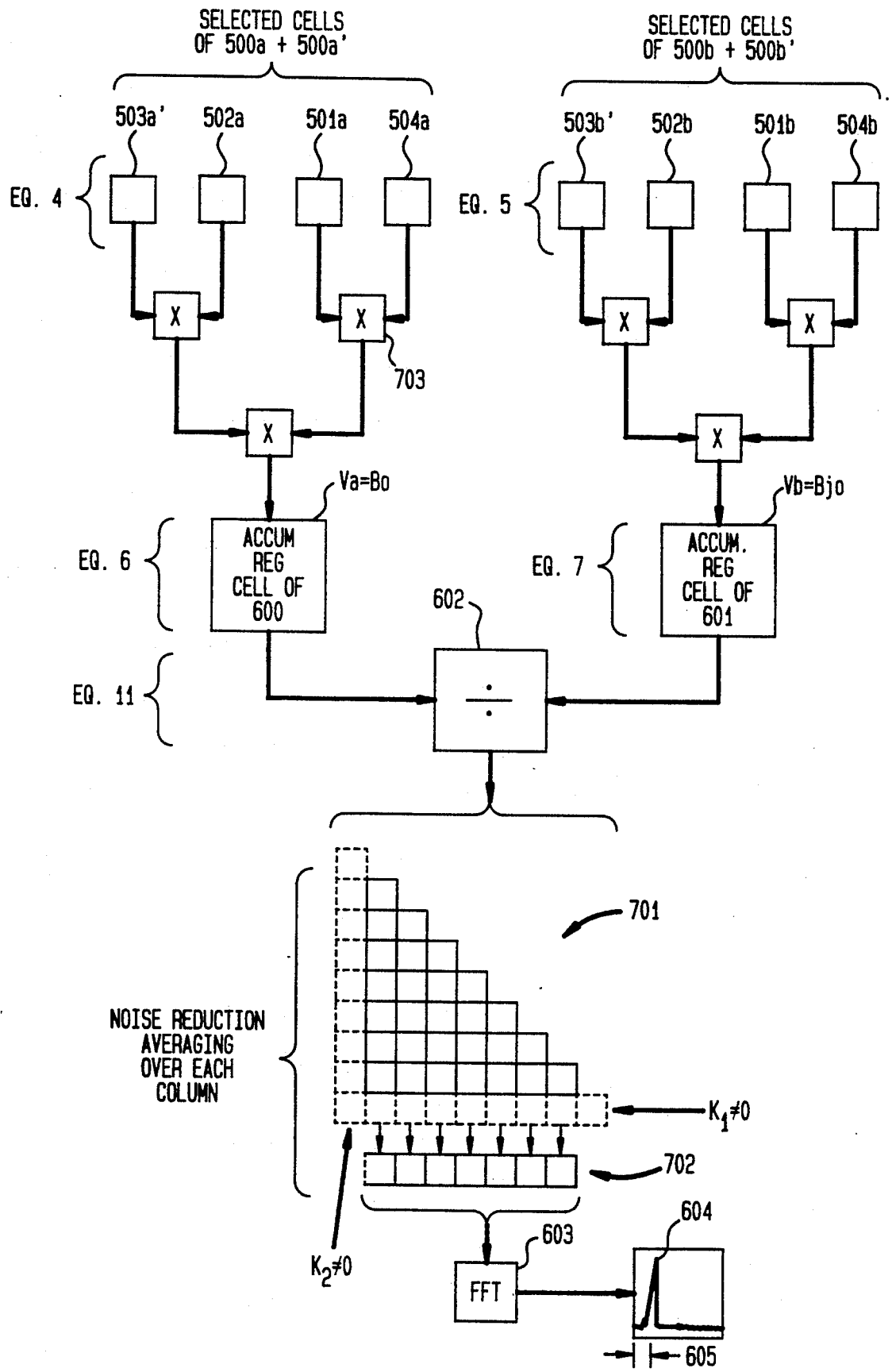
FIG. 4a is a more detailed diagram of a portion of FIG. 4, relating exemplary data processing structure thereof to particular data processing operations, and FIGS. 5, 6, 7, 8, 9 and 10 graphically depict the performance of the invention.

The theory and operation of the present invention will now be described in detail with reference to FIGS. 4 and 4a. The theoretical description of this process begins with a model of the radar signal, r(k), reflected from a target such that $$r_j(k) = (s_j(k) + \eta_{jl} \tag{1}$$

Where $\eta_{jl}$ is noise and clutter. The radar signal has already been converted to baseband using a synchronous detector. The target consists of a non-rotating collection of N point reflectors (scatterers) initially located $x_o$ (meters) from the radar, such that $$s_j(k) = \sum_{n=1}^{N} a_n e^{-i2(x_o + x_j + x_n)(k_o + k)} \tag{2}$$

where $k_o + k$ is the wavenumber (or frequency) of the transmitted pulse and $a_n$ is directly proportional to scatterer's reflection coefficient (non-dimensionalized). (Incidentally, if k is used to represent frequency rather than wavenumber, division of the exponent by c, the speed of light in meters per second, is required in equation (2). However, the equations given are aptly descriptive of the invention in either case.) The terms $r_j(k)$, $s_j(k)$, $a_n$ and $\eta_{jl}$ are complex valued. The real part of $r_j(k)$ is the sampled I values, and the imaginary part of $r_j(k)$ is the sampled Q values. For a given frequency, a single IQ sample pair is taken at the time corresponding to when the transmitted pulse completely envelops the target. As described in Section 2.5 of Wehner, cited above, the $a_n$ are directly related to the target's radar cross section; if each point scatterer was resolved by the radar, then the radar cross section of the $n^{th}$ scatterer would be the magnitude squared of $a_n$. In this model, the $a_n$ are constants. Starting at the initial position, $x_o$, the collection of scatterers moves at a constant velocity along the radar's line-of-sight by the amount $x_j \Delta x_j$, so $x_j$ is a function of time. However, the relative positions of the scatterers, $x_n$, are constant (no target rotation). The noise and clutter, $\eta_{jl}$, is also a function of time. The transmitted wavenumber or frequency is a periodic function of time. The transmitted wavenumber $k_o + k$, is stepped in time at a given pulse repetition frequency (PRF, in Hertz) to define a single burst consisting of L wavenumbers, such that $$k_o + k(l) = \frac{2\pi}{c} f_o + \frac{2\pi}{c} \Delta f(l - 1) \tag{3}$$

where l=1 to L, and $\Delta f$ is the frequency step size. The carrier frequency for the first pulse in the sequence is $f_o$. This sequence is repeated at a given burst frequency. Target motion (change in $x_j$) during a burst is not taken into account; it is assumed to be small relative to a wavelength. Different noise samples, $\eta_{jl}$, are sampled for each frequency and burst; these noise samples are assumed to be statistically independent.

These samples are processed by forming a special two-dimensional slice of the trispectrum and the cross trispectrum, averaging to reduce the influence of noise and clutter, and then forming the transfer function between bursts. For the $j^{th}$ burst this cross trispectral slice is formed by the quadruple product $$B_{j,j+j_o}(k_1,k_2) = r_{j+j_o}(k_1)r_j(k_2)r_j^*(k_3)r_j^*(k_1 + k_2 + k_3)|_{k_3=0} \quad (4)$$

where $k_1$ and $k_2$ are defined over the region $$0 \leq k_1(l) \leq \frac{2\pi}{c} \Delta f(L - 1)$$

and $$0 \leq k_2(l) \leq \frac{2\pi}{c} \Delta f(L - 1)$$

as shown in equation (3). Starting with equation (4), the l index is not written, but is understood to be present. Here, the $j^{th}$ burst is compared to the $j+j_o$ burst. For the $j^{th}$ burst, the trispectral slice is formed by $$B_{j,j}(k_1,k_2) = r_j(k_1)r_j(k_2)r_j^*(k_3)r_j^*(k_1+k_2+k_3)|_{k_3=0} \quad (5)$$

The slice is taken at $k_3=0$. In the first quadrant, this trispectral slice is symmetric about the $k_1=k_2$ axis. These products (e.g. from Equation (4)) are averaged over J bursts to obtain the average cross-trispectral (e.g. computed from return signal data, r, for two time-separated bursts) slice.

$$B_{j_o}(k_1,k_2) = \frac{1}{J} \sum_{j=1}^{J} B_{j,j+j_o}(k_1,k_2) \quad (6)$$

The similarly averaged trispectral (e.g. computed from return signal data for a single burst) slice (e.g. from Equation (5)) is $$B_0(k_1,k_2) = \frac{1}{J} \sum_{j=1}^{J} B_{j,j}(k_1,k_2) \quad (7)$$

The advantage gained by taking the quadruple product in equations (4) and (5) is that these products are insensitive to $x_o$, and that for Gaussian noise, the averages in equations (6) and (7) are unbiased by noise provided $k_1 \neq 0$ and $k_2 \neq 0$. Hence, to find the expected values of equations (6) and (7), the model expressed in equation (2) is substituted into equation (4) and evaluated as if it were the noise free case.

$$B_{j,j+j_o}(k_1,k_2) = \sum_{n=1}^{N} \sum_{m=1}^{N} \sum_{p=1}^{N} \sum_{q=1}^{N} a_n a_m a_p^* a_q^* e^{-i2[\bullet]} \quad (8)$$

where $$[\bullet] = (x_o + x_{j+j_o} + x_n)(k_0 + k_1) + \quad (9)$$

$$(x_o + x_j + x_m)(k_0 + k_2) - (x_o + x_j + x_p)(k_0 + k_3) -$$

-continued $$(x_o + x_j + x_q)(k_0 + k_1 + k_2 + k_3)|_{k_3=0}$$

$x_{j+j_o} = x_j + x_{j_o}$, and $x_{j_o} = \Delta x_{j_o} = x_b$ is the amount of target motion that occurs over $j_o$ bursts. After reordering, the $x_o + x_j$ term is eliminated from equation (9). This is only true for the slice, $k_3=0$. These quadruple products are only sensitive to relative distances between scatterers on the target. In equation (8), the $\Delta x_{j_o}$ term is then factored outside the quadruple summation. Once this term is factored outside the summation, then this quadruple summation is identical to the trispectral slice product in equation (5). Hence, the expected value of the cross trispectral slice is $$b_{j_o}(k_1,k_2) = \theta^{-i2\Delta x_{j_o}(k_0+k_1)} B_0(k_1,k_2) \quad (10)$$

for $k_1 \neq 0$ and $k_2 \neq 0$. Similarly, the expected value of the trispectral slice in equation (7) is unbiased.

The goal of this entire process is to obtain an estimate of the $\Delta x_{j_o}$ term. The target's velocity is then estimated since the time between $j_o$ bursts is known (commanded by the radar).

The derivation of the values of this trispectral slice will now be explained with reference to FIGS. 4 and 4a in order to assist in visualization of the invention. FIG. 4a shows basically the same combination of elements as shown in FIG. 4 except in greater detail (e.g. multipliers 703) and with some structure trispectral and cross trispectral slices and specific cells of registers 500a, 500a', 500b and 500b' involved in computation of Va (which is the same as $B_0$) and Vb (which is the same as $B_{j_o}$) are shown with other cells omitted for clarity). Common reference numerals are used insofar as possible. It should be noted that, in comparison with FIG. 5 of the above incorporated patent application Ser. No. 07/904,927 of Robert D. Pierce, the present invention includes computation of both a trispectral slice 600, and a cross-trispectral slice 601, respectively corresponding to equations (7) and (6) above. The computation of the cross-trispectral slice 601 is identical to that for the trispectral slice, except that for cross-trispectral slice 601, the values in register 500b, will differ from the values in registers 500a, 500a, and 500b; the values in register 500b, corresponding to time $t_{(j+j_o)}$ while the values in other registers corresponds to $t_j$. Therefore, values $V_a$, $V_a'$ of trispectral slice 600 will be symmetrical, as noted in the above-incorporated patent application, but the values $V_b$, $V_b'$ will not be symmetrical in cross-trispectral slice 601.

It will be assumed for purposes of this discussion that the number L of frequencies in a radar burst is equal to 8 although in practice, a larger number is preferable. The return I and Q signal values for each of these frequencies for a burst at time $t_{j_o}$ derived by the coherent radar system schematically illustrated in FIG. 3 is stored, preferably in registers 500a and 500b or other digital storage medium, in accordance with indices indicated as l and (l−1). (See equation (3).) Similarly, values corresponding to a burst at time $t_{j+j_o}$ are preferably stored in register 500b'. These indices arise from the fact that the wavenumber $k_1(l)$ and $k_2(l)$, as used in equation (5), above, is offset by one from the values of l. To obtain a value for any particular discrete location in the trispectral slice in accordance with the rule of Equation (5), it is only necessary to form a product of the values 502a, and 503a and the complex conjugates of values 501a and 504a'. The value Va' would be the same value, by symmetry, since the value at 501 equals the value at 501'. This is so although these values are depicted in separate tables or registers 500a, 500a' (which may be preferable in hardware embodiments of the invention due to the accesses required to form each product) for the simple reason that they represent the radar return signal data corresponding to the same wavenumber in the same burst. Therefore, the computations need only be performed over the principal region of the trispectral slice 600. However, as pointed out above, for cross-trispectral slice 601, the values are different and different registers 500b and 500b, are preferably used (although it should be noted that only a single register could be used for 500a, 500a' and 500b since the data are identical) and the entire cross-trispectral slice computed. The computation is the same as for trispectral slice 600 but slightly less than twice the number of iterations are required since the input values are different and the output values are not symmetrical. However, for symmetrically positioned values such as Vb and Vb', $(k_1+k_2)$ will be equal and the same value of $r_j^*(k_1+k_2)$ can be used to compute all values lying along diagonal lines of the trispectral slice and the cross-trispectral slice, yielding some simplification of the process. As an example of the computation similar to that described above for trispectral slice 600, a value for Vb is found by computing a product of values 502b' and 503b and the complex conjugates of 501b and 504b, corresponding (in order) to the terms in Equation (4), above.

In both of these computations, the value of 501b, corresponding to $r_j^*(k_3=0)$ is used in the computation of the value of each cell of the trispectral slice 600 and the cross-trispectral slice 601 and further hardware and computational simplifications not necessary to the understanding of the invention will be evident to those skilled in the art in view of this observation. For example, taken together with the constant value along diagonally related cells of trispectral and cross-trispectral slices 600 and 601 noted in the preceding paragraph, only two of the factors of the quadruple product change from cell to cell. And one of the multipliers (e.g. 703 of FIG. 4a) could be eliminated.

In implementation of this invention and to derive the improvement in signal-to-noise ratio by averaging in the manner disclosed in the above incorporated application Ser. No. 07/904,927, it is also preferable to perform the summation operations of equations (6) and (7) by accumulation. That is, as the results of equations (4) and (5) are iterated as quadruple products over a sequence of frequencies or wavenumbers, noise is reduced by averaging over a plurality of J bursts by simply accumulating results of quadruple products corresponding to the same pairs of wavenumbers or frequencies in accumulating registers such as Va and Vb of FIG. 4a which simply add input data to their contents. While this accumulation technique for averaging and noise reduction will develop somewhat different actual values of the trispectral slice and the cross-trispectral slice than if such accumulation is not done, the first and last bursts will remain represented in both the trispectral slice 600 and the cross-trispectral slice 601, and the rule for choosing values of $r_j$ from which the product of Equation (4) is formed is sufficient to produce the desired result of estimation of target velocity.

The computation itself is quite simple and straight forward and the sequence of computations necessary for a single trispectral slice 600 from one burst can be accomplished by a simple series of loops as would be described in FORTRAN ™ by the steps:

```
      cfact=conjg(mfsu(1))
      do 220 i=1, nrng
      do 240 j=1, nrng
      ij=i+j-1
      if (ij.gt.nrng) go to 241
      save(i,j)=save(i,j)+mfsu(i)*mfsu(j)*
         conjg(mfsu(ij))*cfact
  241 continue
  240 continue
  220 continue
``` which is the salient portion of the preferred program for implementing the invention in software. The corresponding program to compute the cross-trispectral slice would contain another variable name (e.g. saveb(i,j)) for the variable "save(i,j)" and another variable (e.g. mfsa(i)) for the variable "mfsu(i)" in the sixth line thereof The transfer function estimate, $H(k_1)$, is formed by dividing the cross trispectral slice, equation (6), by the trispectral slice, equation (7).

$$H(k_1) = \frac{B_{j_o}(k_1,k_2)}{B_o(k_1,k_2)} = e^{-i2\Delta x_{j_o}(k_0+k_1)} \quad (11)$$

on a cell-by-cell basis through corresponding cells e.g. (Va/Vb, Va'/Vb', etc.) of the trispectral slice and the cross-trispectral slice, provided $k_1 \neq 0$ and $k_2 \neq 0$. (This constraint, mentioned earlier, as a practical matter, allows the first column and the bottom row of cells of such ratios to be ignored or the computation to be omitted as indicated by the dashed line cells in half-matrix 701, output from 602, as illustrated in FIG. 4a. The computation is simply performed by iterating through corresponding cells of the trispectral slices 600 and 601 and performing a division of the value in a cell of trispectral slice 601 by the value of the corresponding cell of trispectral slice 600.

This transfer function can be evaluated without evaluating $k_1$ or $k_2$ at zero. Since the transfer function estimate at different values for $k_2$ is the same for each $k_1$, that is, the portion of the value in each cell attributable to a returned signal from the target will be the same for all $k_2$, the transfer function estimate can be averaged over $k_2$ (e.g. in columns) to produce an estimate with lower variance (e.g. reduced noise) for storage in register 702. For the moderate to high signal-to-noise, this estimator is unbiased. This computation corresponds to equation (11) as indicated at 602 of FIGS. 4 and 4a.

The distance, $\Delta x_{j_o}$ (the same as $x_b$), can be estimated (605) from this transfer function estimate. The Fourier transform (via the Fast Fourier Transform, FFT, indicated at 603 of FIG. 4) of this transfer function estimate will peak at the distance $\Delta x_{j_o}$. This can also be performed by iterative comparison 604 of values of the Fourier transform of the ratios found at 602 or the result merely displayed and visually evaluated by a user. The number of bursts displaced, $j_o$, can be varied to increase this distance and make its estimation easier ($j_o$ cannot be arbitrarily large since target rotation and acceleration will eventually make these averages incoherent.)

When radar samples are taken that include system noise and clutter, the averaging process in equations (6) and (7) will suppress this noise. If the target rotates a small amount during the observation time (J bursts), then these fluctuations would also look like noise.

For a finite number of bursts, J, the transfer function estimator has a mean and variance. To analyze the performance of this estimator, statistically independent samples of complex, zero mean Gaussian noise are assumed for $\eta_{jl}$. The noise is assumed to decorrelate from one radar pulse to the next. (Sea clutter, for example, can decorrelate slowly from one burst to the next; however, between adjacent pulses at different frequencies, decorrelation is rapid.) The derivation of the estimator's mean and variance assumes moderate to high signal-to-noise ratio. The mean for the transfer function estimate is unbiased.

$$\mu_H = E\left[\frac{B_{jo}(k_1,k_2)}{B_o(k_1,k_2)}\right] = e^{-i2\Delta x_{jo}(k_0+k_1)} \quad (12)$$

Along either the $k_1=0$ or the $k_2=0$ axis, additional terms will bias this estimator. The noise variance is $\sigma^2$, such that $$\sigma^2 = E[\eta_{jl}\eta^*_{mn}] \quad (13)$$

for $j=m$ and $l=n$ and zero otherwise. (Correlation from one burst to the next at the same frequency will not, however, bias the off-axis terms in equation (12)). Hence, the noise biases this estimator only along each axis; in the interior, unbiased estimates are obtained. The variance of this estimator is $$\sigma^2_H = E[HH^*] - \mu_H \mu^*_H \quad (14)$$

Except for the $k_1=0$ and the $k_2=0$ axis, the estimator's variance is $$\sigma_H^2 = \frac{2}{J}\left[3\frac{\sigma^4}{(SS^*)^2} + 3\frac{\sigma^6}{(SS^*)^3} + \frac{\sigma^8}{(SS^*)^4}\right] \quad (15)$$

For the purpose of approximating the estimator's variance, the signal power is approximated using equation (2) to give $$SS^* = \left|\sum_{n=1}^{N} a_n e^{-i2(x_0+x_n)(k_0+k)}\right|^2 \quad (16)$$

where the signal power at each frequency is assumed to be the same for the variance derivation. (The right side of equation (16) could be averaged over frequency to obtain a better estimate for the signal power.) The estimator's variance is a consistent estimator, as J increases, the variance approaches zero. Next, the signal-to-noise ratio, SNR, is defined as $$SNR = \frac{SS^*}{\sigma^2} \quad (17)$$

In terms of the signal-to-noise ratio, the estimator's variance becomes $$\sigma_H^2 = \frac{2}{J}\left[\frac{3}{SNR^2} + \frac{3}{SNR^3} + \frac{1}{SNR^4}\right] \quad (18)$$

This approach is compared to methods using second order averages or cross spectra. In this case the double products that would correspond to equations (4) and (5) are $$R_{j,j+j_0}(k) = r_{j+j_0}(k) r^*_j(k) \quad (19)$$

and $$R_{j,j}(k) = r_j(k) r^*_j(k) \quad (20)$$

The cross spectral estimate averaged over J bursts is $$R_{j_0}(k) = \frac{1}{J}\sum_{j=1}^{J} R_{j,j+j_0}(k) \quad (21)$$

and the auto spectral estimate averaged over J bursts is $$R_o(k) = \frac{1}{J}\sum_{j=1}^{J} R_{j,j}(k) \quad (22)$$

These averages are also insensitive to $x_o$, but they are biased by noise (Gaussian or otherwise). Using the assumptions made for the earlier derivation, the transfer function is estimated by the ratio of these two spectra.

$$\mu_{H2} = E\left[\frac{R_{j_0}(k)}{R_o(k)}\right] = e^{-i2\Delta x_{jo}(k_0+k)}\left(1 - \frac{\sigma^2}{s(k)s^*(k)}\right) \quad (23)$$

(Correlated noise will produce an additional bias term.) The estimator is biased by additive noise, $\sigma^2$. For a frequency dependent target, the target's signal power, $s(k)s^*(k)$, will fluctuate. The transfer function estimate is then the actual transfer function convolved with the reciprocal of the target's signal power fluctuations. The goal is to estimate the distance, $\Delta x j_o$, from the location of the peak of the transfer function estimate's Fourier transform. The bias can give a random or noise-like appearance to the Fourier transform that will confuse estimation of the distance. These signal power fluctuations are dismissed as second order variations when using the SNR to derive the variance of the estimator; however, these fluctuations cannot be ignored when estimating the transfer function.

The variance of the transfer function estimate is $$\sigma_{H2}^2 = E[HH^*] - \mu_{H2}\mu^*_{H2} = \frac{2}{J}\frac{1}{SNR^2} \quad (24)$$

where SNR is defined in equation (17).

In comparing the two methods, the trispectral slice approach is not biased by Gaussian noise; however, it is more sensitive to the statistical variability produced by the noise. The trispectral slice method requires more averaging to reduce the variance in the transfer function estimates to levels identical to both approaches. At high SNR (10 db), three times the number of averages is required for the same variance, and at moderate SNR (0 db), seven times the number of averages is required. However, taking more averages will not reduce the bias error expressed in equation (24) since $s(k)s^*(k)$ will, in general, vary with frequency. If averaging is performed over $k_2$ in the trispectral slice approach, then these fluctuations will be reduced. The performance of the trispectral approach will then be similar to the second order approach for high to moderate SNR using the same number of averages.

Figure 5:
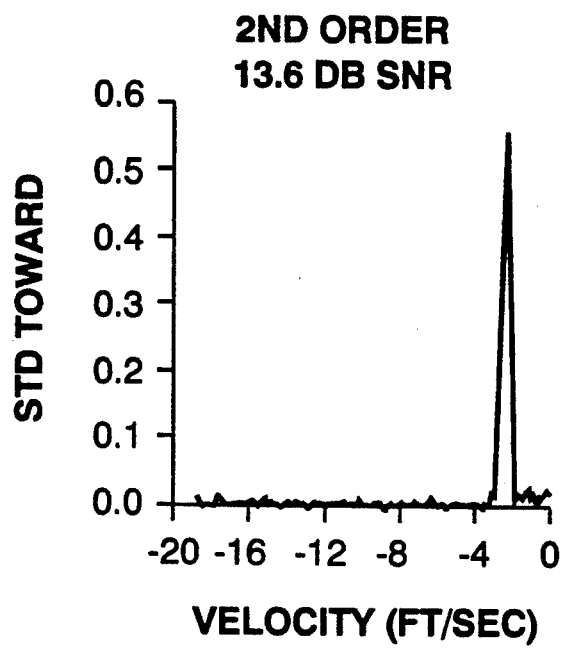
Figure 6:
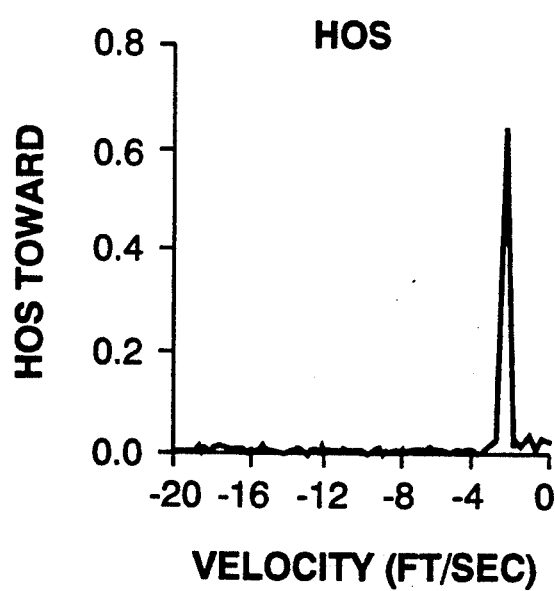
Figure 7:
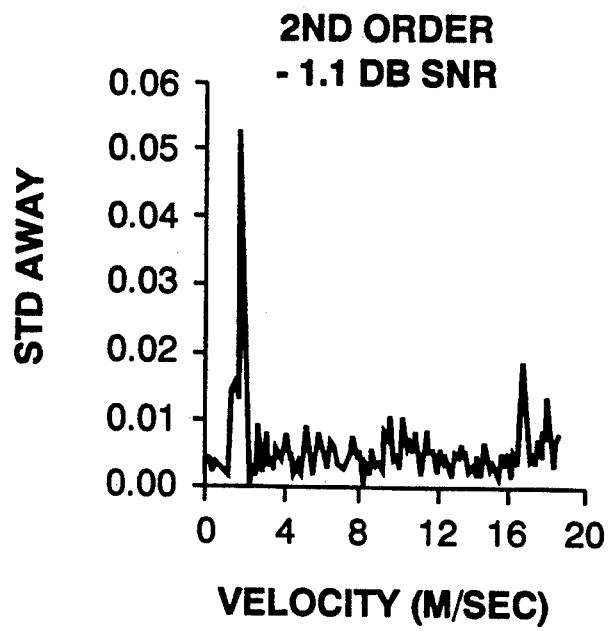
Figure 8:
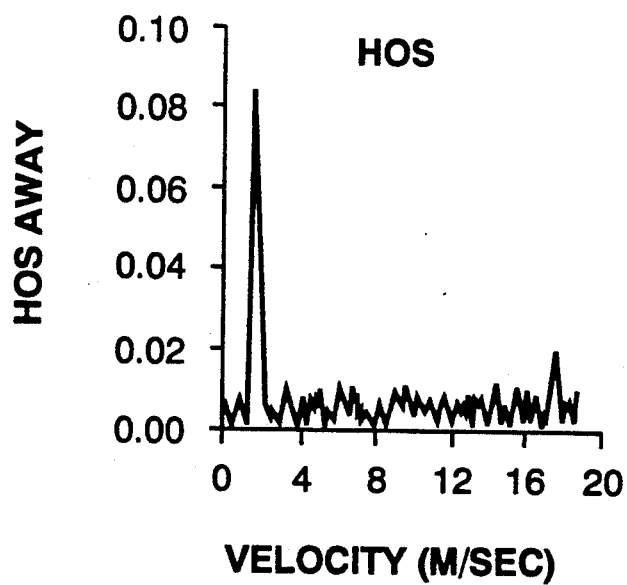
Figure 9:
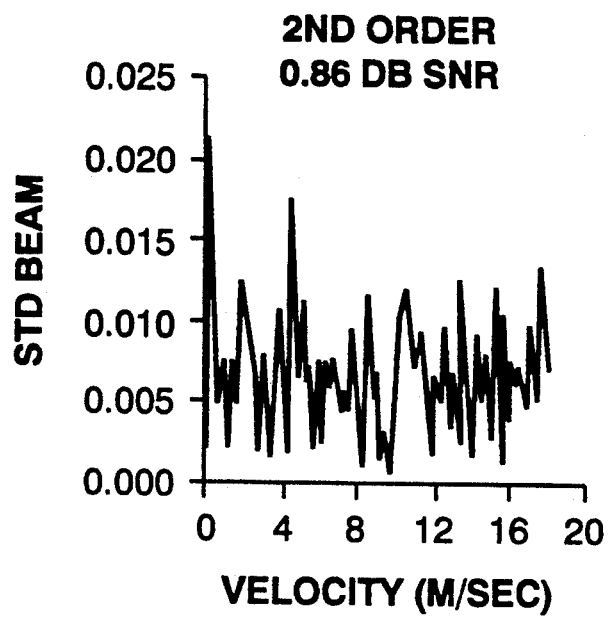
Figure 10:
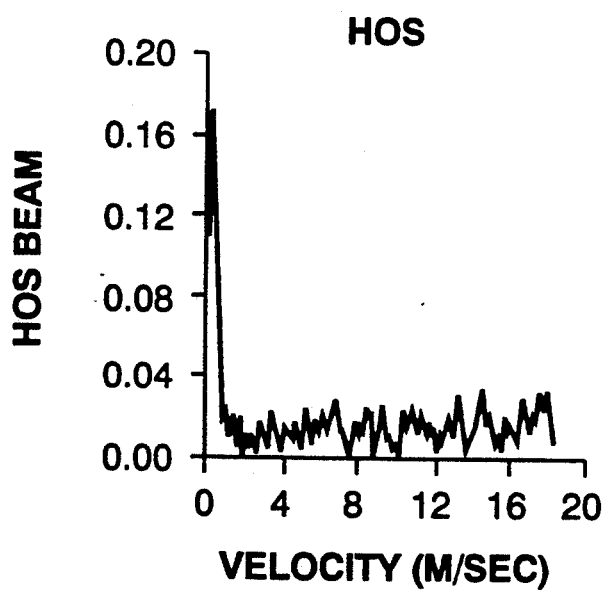

To demonstrate the ability of this moving target indicator to measure the velocity of radar targets, this process was applied to real test data The results are shown in FIGS. 5-10 in which consecutively numbered pairs of figures compare the results of the computation of the invention (FIGS. 6, 8 and 10) in a HRR environment (e.g. while also providing high resolution and noise rejection) with the measurements obtained with second order techniques (FIGS. 5, 7 and 9). These Figures show results for a target moving toward, away and sideways to the radar, respectively. In this case the delay was 20 bursts or one second of radar data. The target is moving at a nominal 2 meters per second in sea clutter. For high SNR both methods work equally well; however, for SNR near zero dB, the second order approach is seen to be inconsistent due to noise and clutter. The HOS moving target indicator is seen to work in the presence of noise.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of estimating velocity of a radar target including the steps of
   reflecting at least first and second bursts of energy from a radar target, said first and second bursts being separated in time, each said burst of energy including a plurality of frequencies or wavenumbers, and deriving a value from said energy reflected from said target for each said frequency or wavenumber of each said burst,
   computing values of a trispectral slice from said values derived from for a plurality of frequencies or wavenumbers of said first burst,
   computing values of a cross-trispectral slice from said values derived from for a plurality of corresponding frequencies or wavenumbers of said first and second bursts,
   deriving ratios of corresponding values of said trispectral slice and said cross-trispectral slice to form a series of values corresponding to a function of frequencies or wavenumbers of said first burst,
   performing a transformation of at least one of said series of values corresponding to a function of frequencies or wavenumbers of said first burst and said function of frequencies or wavenumbers of said first burst to form a function of time, and
   estimating said velocity from a maximum value of said function of time.

2. A method as recited in claim 1, including the further step of averaging said ratios corresponding to respective frequencies of said first burst.

3. A method as recited in claim 1, wherein at least one of said steps of computing said trispectral slice and computing said cross-trispectral slice includes a step of accumulating values over a plurality of said bursts.

4. A radar system including
   means for computing values of a trispectral slice from complex values corresponding to energy in at least a first energy burst reflected from a target,
   means for computing values of a cross-trispectral slice from complex values corresponding to energy in at least said first energy burst and a second energy burst reflected from a target, said second burst of energy being separated in time from said first burst of energy, and
   means for computing a ratio of corresponding values of said trispectral slice and said cross-trispectral slice.

5. A radar system as recited in claim 4, further including
   means for transforming an output of said means for computing values of a ratio of corresponding values of said trispectral slice and said cross-trispectral slice to derive a function of time, and
   means for outputting at least a maximum value of said function of time.

6. A radar system as recited in claim 5, wherein said means for outputting comprises a display.

7. A radar system as recited in claim 4, further including
   means for averaging values of at least one of said trispectral slice and said cross-trispectral slice over a plurality bursts of energy.

8. A radar system as recited in claim 7, wherein said means for averaging values of at least one of said trispectral slice and said cross-trispectral slice over a plurality bursts of energy includes at least one accumulating register.

9. A radar system as recited in claim 4, wherein bursts of energy reflected from a target contain a plurality of frequencies or wavenumbers, said radar system further including
   means for averaging said values of said ratio at at least one frequency or wavenumber included in said first burst of energy.

10. A radar system as recited in claim 7, wherein bursts of energy reflected from a target contain a plurality of frequencies or wavenumbers, said radar system further including
   means for averaging said values of said ratio at at least one frequency or wavenumber included in said first burst of energy.

* * * * *